(12) United States Patent
Tan

(10) Patent No.: US 10,984,415 B2
(45) Date of Patent: Apr. 20, 2021

(54) SYSTEM AND METHODS FOR USING LIMIT-USE ENCRYPTED CODE TO TRANSFER VALUES SECURELY AMONG USERS

(71) Applicant: Li Tan, Richland, WA (US)

(72) Inventor: Li Tan, Richland, WA (US)

(*) Notice: Subject to any disclaimer, the term of this patent is extended or adjusted under 35 U.S.C. 154(b) by 1697 days.

(21) Appl. No.: 13/913,167

(22) Filed: Jun. 7, 2013

(65) Prior Publication Data

US 2013/0346319 A1    Dec. 26, 2013

Related U.S. Application Data

(60) Provisional application No. 61/664,103, filed on Jun. 25, 2012.

(51) Int. Cl.
| | | |
|---|---|---|
| *G06Q 20/38* | (2012.01) | |
| *G06Q 20/32* | (2012.01) | |
| *G06Q 20/40* | (2012.01) | |
| *G06Q 20/10* | (2012.01) | |

(52) U.S. Cl.
CPC ......... *G06Q 20/3829* (2013.01); *G06Q 20/10* (2013.01); *G06Q 20/3276* (2013.01); *G06Q 20/3278* (2013.01); *G06Q 20/385* (2013.01); *G06Q 20/3823* (2013.01); *G06Q 20/38215* (2013.01); *G06Q 20/4012* (2013.01)

(58) Field of Classification Search
CPC ............................ G06Q 20/10; G06Q 20/3829
USPC .......................................................... 705/75
See application file for complete search history.

(56) References Cited

U.S. PATENT DOCUMENTS

| | | | | |
|---|---|---|---|---|
| 5,590,197 | A  * | 12/1996 | Chen ....................... | G06Q 20/04 380/30 |
| 2003/0018567 | A1* | 1/2003 | Flitcroft ................. | G06Q 20/02 705/37 |

(Continued)

OTHER PUBLICATIONS

ISO/IEC, Automatic Identification and Data Capture Techniques—QR code 2005 bar code symbology specification.[online]. 2009 International Standard ISO/IEC 18004:2006. [retrieved on Jun. 6, 2013 ] Retrieved from the Internet: <URL: http://webstore.iec.ch/corrigenda/iso/isoiec18004-cor1%7Bed1,0%7Den.pdf>.

(Continued)

*Primary Examiner* — Mohammad A. Nilforoush
*Assistant Examiner* — Cristina Owen Sherr

(57) ABSTRACT

A system and method for facilitating a secured value transfer. A first user and the system obtain a pair of encryption and decryption apparatuses. The first user creates a request including his unique identifier and a value to be transferred. The first user encrypts the request using the encryption apparatus and sends it to the second user. The second user sends to the system the request and the second user's unique identifier. The system uses the decryption apparatus to decrypt the request. The system checks the usage of the request against a threshold limit. After a successful usage check, the system then transfers the value from the first user to the second user. The system may comprise (a) a plurality of system server for exchanging data with users' personal computing devices, registering users, and conducting transactions, and (b) data storages storing user accounts and other persistent data.

12 Claims, 17 Drawing Sheets

(56) References Cited

U.S. PATENT DOCUMENTS

| | | | | |
|---|---|---|---|---|
| 2003/0028481 | A1* | 2/2003 | Flitcroft | G07F 19/00 |
| | | | | 705/39 |
| 2003/0152229 | A1* | 8/2003 | Entani | G06K 7/14 |
| | | | | 380/243 |
| 2004/0006695 | A1* | 1/2004 | Ishibashi | H04L 9/3263 |
| | | | | 713/175 |
| 2004/0153410 | A1* | 8/2004 | Nootebos | G06Q 20/28 |
| | | | | 705/44 |
| 2005/0273431 | A1* | 12/2005 | Abel | G06Q 20/102 |
| | | | | 705/42 |
| 2006/0190720 | A1* | 8/2006 | Ozaki | H04L 63/0428 |
| | | | | 713/160 |
| 2006/0253340 | A1 | 11/2006 | Levchin et al. | |
| 2007/0041583 | A1* | 2/2007 | Boneh | H04L 9/3073 |
| | | | | 380/28 |
| 2008/0020707 | A1* | 1/2008 | Takayama | H04L 9/0838 |
| | | | | 455/41.2 |
| 2009/0287599 | A1* | 11/2009 | Lamar, III | G06Q 20/42 |
| | | | | 705/39 |
| 2012/0267432 | A1 | 10/2012 | Kuttuva | |
| 2013/0144706 | A1 | 6/2013 | Qawami et al. | |

OTHER PUBLICATIONS

Landau, S. Standing the Test of Time: The Data Encryption Standard. 2000. Notices of American Mathematics Society. vol. 47, No. 3.

Riveest R.L., Shamir A., and Adleman L. A Method for Obtaining Digital Signatures and Public-Key Cryptosystems. 1978. Communication of ACM. vol. 21(2), pp. 120-126.

Gilbert H. and Handschuh H. Security Analysis of SHA-256 and Sisters. 2004. Springer-Verlag Berlin Heidelberg. vol. 3006: pp. 175-193.

Apple. iOS Passbook. [online] [retrieved from the internet Jun. 7, 2013] Retrieved from the Internet: <URL http://www.apple.com/ios/whats-new/#passbook>.

Starbucks. Square Wallet. [online] [retrieved from the internet Jun. 7, 2013] Retrieved from the Internet: <URL http://www.starbucks.com/coffeehouse/mobile-apps/square-wallet>.

Google. Google Wallet. [online] [retrieved from the internet Jun. 7, 2013] Retrieved from the Internet: <URL http://www.google.com/wallet>.

Square. Square Wallet. [online] [retrieved from the internet Jun. 7, 2013] Retrieved from the Internet: <URL https://squareup.com/wallet>.

Isis. Isis mobile wallet. [online] [retrieved from the internet Jun. 7, 2013] Retrieved from the Internet: <URL https://www.paywithisis.com/>.

QRPAY. QR Pay. [online] [retrieved from the internet Jun. 7, 2013] Retrieved from the Internet: <URL http://www.qrpay.com/qr-pay>.

LevelUp. LevelUp app. [online] [retrieved from the internet Jun. 7, 2013] Retrieved from the Internet: <URL https://www.thelevelup.com/how-it-works>.

* cited by examiner

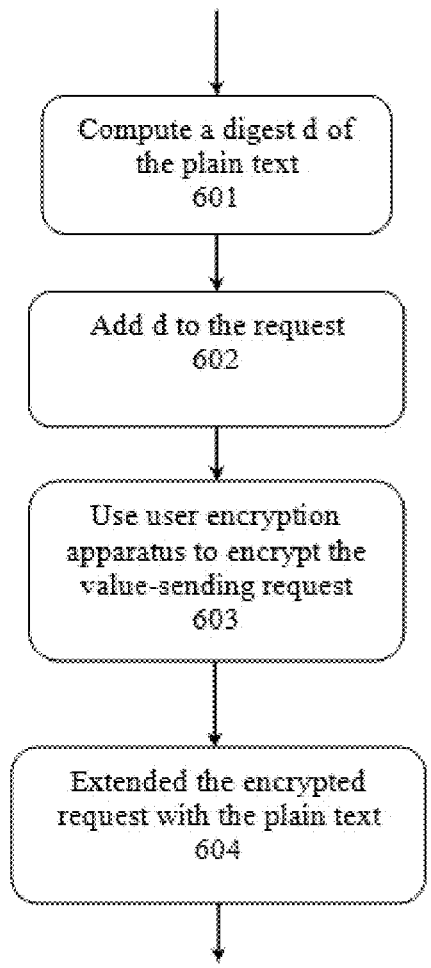
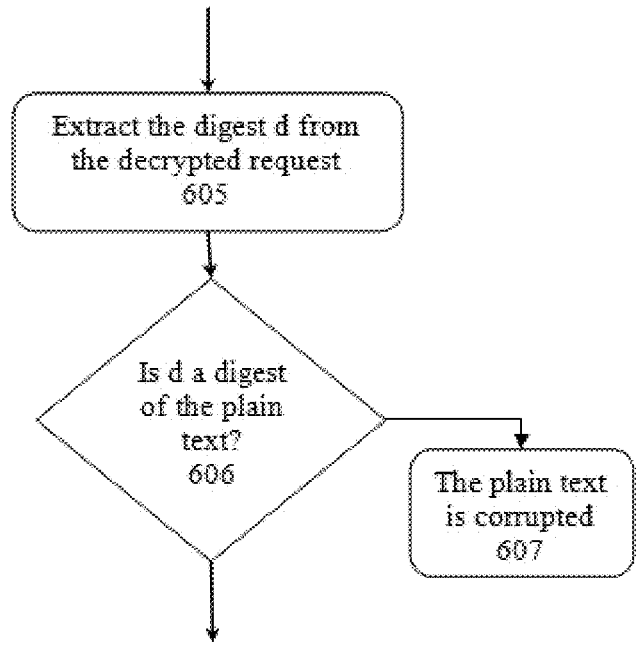
Figure 6A
Figure 6B

SYSTEM AND METHODS FOR USING LIMIT-USE ENCRYPTED CODE TO TRANSFER VALUES SECURELY AMONG USERS

CROSS REFERENCES TO RELATED APPLICATIONS

The present application is a non-provisional of and claims the benefit and priority under 35 U.S.C. 119(e) of U.S. Provisional Application No. 61/664,103 filed Jun. 25, 2012 entitled SYSTEM AND METHODS FOR USING LIMIT-USE ENCRYPTED CODE TO TRANSFER VALUES SECURELY AMONG USERS, the entire contents of which are incorporated herein by reference for all purposes.

BACKGROUND

Nowadays electronic payment, for example mobile payment, is increasingly popular. Mobile payment provides an on-the-go payment option. The popularity of mobile payment is also assisted by the proliferation of handheld digital devices such as smart phones (e.g. iPhone, Android-based phones). Depending on whether payment is processed through a wireless carrier, the forms of mobile payment may be sorted to two categories: carrier-based ones and non-carrier-based ones.

A current form of carrier-based mobile payment is to use a text messaging service. User makes payment by sending a text message to a predefined number. For example, AT&T currently supports carrier-based mobile paperless payment option, in which a user (payer) can send a message to a short code. The message is sent through Short Message Service (SMS) and the short code is a special number which is significantly shorter than the full telephone number. Because SMS-based mobile payment is a carrier-based solution, it limits user's selection of payment processing agents to wireless carriers. The SMS-based mobile payment also requires that a wireless communication is present between a payer's mobile device and the system. There are also some security/privacy concerns on sending payment as a regular text message.

Mobile web payment is another form of mobile payment. A payer browses the webpage of a payee on an internet-connected mobile device, and makes an online purchase. After the transaction, the payee sends out the good that the user purchases, or provides a receipt page which the payer may print out and bring to the payee's store for pickup. Although this mobile web payment is through mobile device, it is just a special case of online payment which generally involves the user to use an internet-connected device such as his/her personal computer to view the payment page and make the purchase. Mobile web payment requires that an internet connection is presented between a payer's mobile device and the system. Another concern on mobile web payment is how well it may fit into a traditional workflow of off-line purchases: for example, to purchase a cup of coffee at a local coffee store through mobile web payment, a user views the store's webpage and makes a payment, instead of just paying at cashier directly.

Contactless Near-Field Communication (NFC)-Based Payment is yet another form of mobile payment. In NFC-based payment system, user's mobile device is equipped with a NFC chip. At the time of transaction, the payer touches his/her NFC-enabled mobile device at a NFC-equipped sales terminal. The system then processes the payment using the information provided by the payer's mobile device. The sales terminal may optionally request the payer to enter his/her PIN to authorize the transaction. NFC-enabled payment requires some significant infrastructure investment. To receive payments, small business owners need to invest on NFC-equipped sales terminals.

BRIEF SUMMARY

In one embodiment of the present disclosure, a system and methods are provided for securely transferring values between two users using limit-use encrypted code. The system and methods hereof do not assume that users are reliable and secured. The present disclosure provides means to protect users involved even when one or both users are compromised.

In one embodiment of the present disclosure, the system may comprise one or more servers configured to register users. A user account includes user's identification and financial information that are necessary for defining and transferring values. In what follows, we refer to a user as a payer if he/she sends value, and as a payee if he/she receives value. In this embodiment a user may deploy a personal computing device to execute his tasks, defined in accordance with methods of the present disclosure. The personal computing device may be any form of digital device with a plurality of processors and storage storing instruction. Examples of a personal computing device include Personal Computers (PCs), Personal Data Assistants (PDAs), digital handheld devices, smart-phones, and tablet computers. We refer to a personal computing device as a personal payment device, if it is used during a value-transferring transaction.

In one embodiment of this disclosure, the system may comprise a plurality of financial servers interacting with other system servers and external financial institutions. A financial institution enables the system to obtain values from or send values to an external funding source.

Prior to a transaction, users involved in the transaction register with the system. A payer's personal payment device is synchronized with the system, and it agrees with the system on a pair of decryption and encryption apparatuses. We refer to these apparatuses as payer cryptography apparatuses. Virtually any cryptography apparatus may be used as payer cryptography apparatuses, provided the payer encryption apparatus can encrypt a message in a way that only the payer decryption apparatus may decrypt the message within reasonable time and cost.

In one method of the present disclosure, the payer uses her personal payment device to create a request for transferring a value, and the request is encrypted using the payer encryption apparatus. The request includes the payer's identification. It may also include other information that facilitates the requested transaction. In one method of the present disclosure, the request includes the actual amount of the value being transferred to a payee. In another method of the present disclosure, the value-sending request includes the maximal amounts of values that may be transferred.

The encrypted request is transmitted to a payee's personal payment device. Virtually any media that enables communication between client computing devices may be used for transmission. In one embodiment of the present disclosure, the encrypted request is encoded in a graphic format (e.g. Quick Response code) and presented to the payee. The payee uses his personal payment device to scan the graphic code. In another implementation hereof, the transmission is conducted using near-field communication (NFC).

The payee's personal payment device sends to the system the request received from the payer as well as the payee's identification. The payee may send to the system other information that facilitates the transaction. For example, in accordance to one method of the present disclosure, in the message sent to the system the payee also specifies the amount of the value the requests.

After receiving the request via the payee, the system uses the payer decryption device to decrypt the request. The system also checks the usage of the request again its usage limit. The usage limit may be defined as a system-wide policy, per user basis, or per transaction basis. In one method of the disclosure, the payer may also specify in a request the usage limit of the request. Usage limit may refer to any quantitative or qualitative means to establish validity of a request. In an embodiment of the present disclosure, the usage limit is the maximal number for which a request may be used. In one implementation of the embodiment, the usage limit is set to one, making every request single-use only. In such a case, a payee cannot cache the request from a payer and use it for more than one time, removing the possibility of a payer being overcharged by a compromised payee using the same request.

After validating the usage limit of the request, the system performs the requested value-transfer transaction. Depending on implementation, the execution of the transaction may involve financial servers that interact with external financial institutes to transfer a value.

Methods of the present disclosure may include addition means to protect payers and payees. In one method of the present disclosure, a payer selects a Personal Identification Number (PIN) before a transaction. After the system validates the request, the system requests the payee to obtain the payer's PIN. The payer enters her PIN into the payee's personal payment device, which then sends the PIN to the system for validation. In this method, the PIN and an encrypted value-sending request facilitate multiple-factor authentication.

Virtually any means of value transfer may be associated with the system. Users may introduce values into their system accounts via credit card, check, cash, electronic funds transfer, direct deposit, etc. The value being exchanged between transaction parties may be monetary (e.g. represented by United States Dollars or other currency) or in some other form, such as credits, vouchers, personal information, etc. as long as the values are acceptable for a payer and a payee.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates the same items.

FIG. 6A is a flow graph providing an enlarged view of the method used in FIG. 5 to extend a value-sending request with a plain text, and FIG. 6B is a flow graph providing an enlarged view of the method used in FIG. 5 to validate the plain text attached to a request.

DETAILED DESCRIPTION

Figure 1:
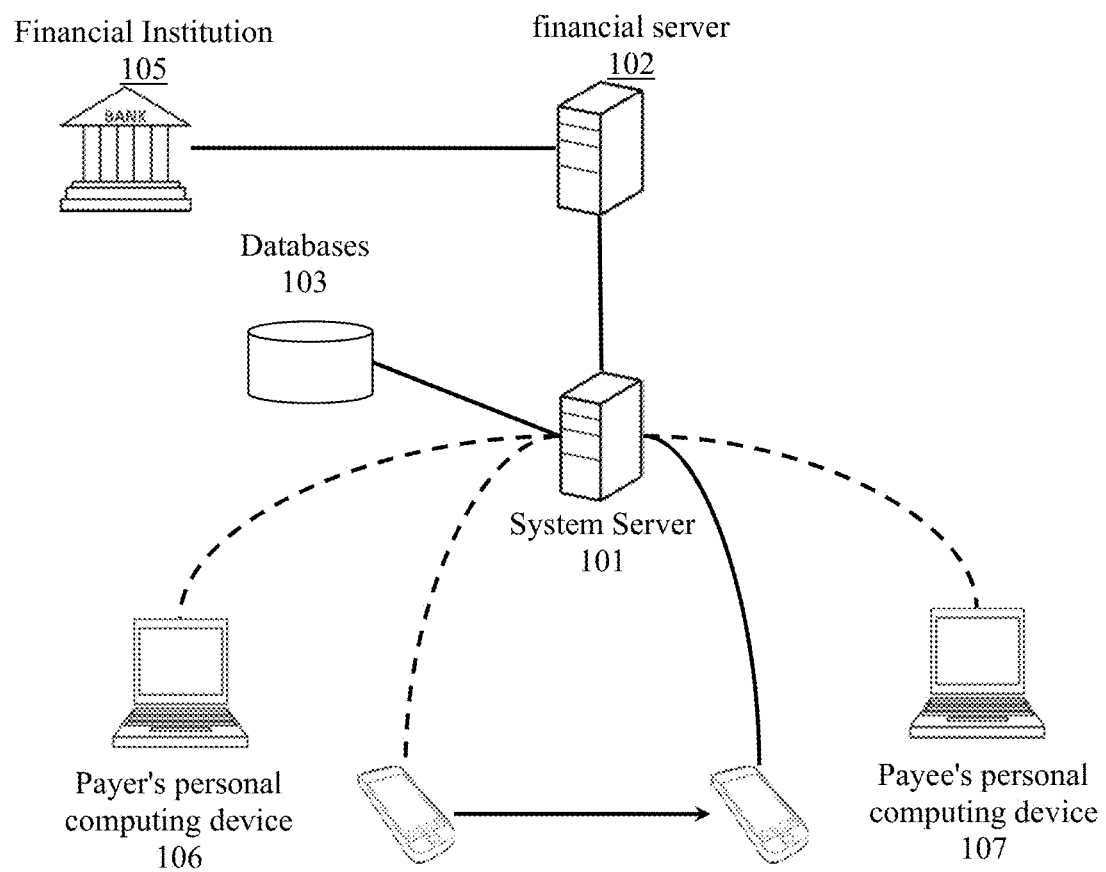
FIG. 1 is a block diagram depicting a system for facilitating a secured value transfer among users, in accordance with an embodiment of the present disclosure.

In the following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The following description is presented to enable any person having ordinary skill in the art to make and use the present disclosure, and is provided in the context of particular applications of the present disclosure and their requirements. Various modifications to the disclosed embodiments will be readily apparent to those having ordinary skill in the art and the general principles defined herein may be applied to other embodiments and applications without departing from the spirit and scope of the present disclosure. Thus, the present disclosure is not intended to be limited to the embodiments shown, but is to be accorded in the widest scope consistent with the principles and features disclosed herein.

The illustrations of executions of an embodiment of the current disclosure incorporate general-purpose computers as well as special purpose digital devices such as smart-phones. Details of such devices (e.g. processor, memory, data storage, display, camera, wired/wireless communication capability) are omitted for the sake of clarity.

It may also be understood that the system and methods of the present disclosure might be implemented using variety of technologies. For example, the methods described herein may be implemented as software program on a computer, or as a hardware circuit, or various combinations of hardware and software. In particular, the methods described herein may be implemented by a series of computer instructions residing on a storage medium such as disk drives and other computer readable medium. The methods may use a variety of communication media that facilitate information exchange between components (e.g. system servers and client computing devices) of an embodiment of the present convention. Examples of communication media include a printed or displayed graphic code, and carrier waves. Exemplary forms of carrier waves include electrical, electromagnetic, or optical signals carrying information on a plurality of wired and wireless networks.

Introduction

In one embodiment of the present disclosure a system and methods are provided for transferring values securely among users using limit-use encrypted code. Values being transferred may be monetary in nature or may take other forms, such credits, debits, vouchers, coupons, tickets, personal information, prescriptions, medical records, and certificates such as drive licenses and the proof of insurance, etc as long as the values are acceptable for both a payer and a payee.

Personal computing devices may be used to assist users on computational tasks defined in an embodiment of the present disclosure. A personal computing device may or may not be portable in nature, and may deploy virtually any communication media, including both wired and wireless. Examples of personal computing device include Personal Computer (PC), Personal Data Assistants (PDA), smart-phones, and other digital handheld devices.

Personal payment devices are personal computing devices used by payers and payees to execute computational tasks defined by methods in the present disclosure.

In some methods defined in the present disclosure, a payee's personal payment device sends data to the system. The connection between the payee's personal payment device and the system may be permanent or temporary, and may be through a local network or a publicly accessible network such as the Internet.

One embodiment of the present disclosure comprises a means of transmitting data from a first user ("payer") to a second user ("payee"). Transmission may be conducted using various media and procedures. For instance, the data may be transferred using near-field communication (NFC)-enabled client computing devices, or it can be encoded as a graphic code such as a Quick Response (QR) code and scanned into the payee's personal payment device.

In the present disclosure, a pair of decryption and encryption apparatuses are used to encrypt and decrypt a value-sending request made by a payer. Virtually any pair of decryption and encryption apparatuses may be used, provided that the data encrypted by the encryption apparatus may be decrypted with the decryption apparatus within a reasonable time and cost. Examples of cryptography apparatus include symmetric and asymmetric cryptography algorithms, being implemented in software program or hardware logic. In one implementation of an embodiment of the present disclosure, a public-private key cryptography algorithm such as Data Encryption Standard (DES) is used. Prior to a value transfer, the system and the payer's personal payment device receive an implementation of the DES algorithm. The payer's personal payment device uses its DES algorithm to generate a public-private key pair $<K_{public}, K_{private}>$. The payer personal payment device keeps the private key $K_{private}$, and sends the public key $K_{public}$ to the system.

In the present disclosure, the system checks the usage limit of a request created by a payer. Usage limit may be defined using virtually any means for specifying the validity of a token. In one embodiment of the present disclosure, a usage limit is defined as the maximal number of times that the same value-sending request may be used. In this embodiment the system keeps a record on how many times the same request has been sent to it. In another embodiment hereof, the usage limit is defined as the expiration date of a value-sending request, and the system rejects any request received after its expiration date. Usage limit may be defined as a system-wide policy. Or it may be user-specific and associated with a user's account. Or it can be transaction-specific, in which case a custom usage limit may be encoded in a request.

A system according to this embodiment of the present disclosure comprises a plurality of computer servers configured to register users or to process requests for value exchanges. Illustratively, users who wish to involve in a transaction register with a server prior to the transaction. A subset of system servers also process encrypted requests created by payers and sent via payees. The process includes decrypting an encrypted request, and checking the usage limit of the request.

In an extension of this embodiment of the disclosure, the system may include a plurality of web servers hosting Internet portal (e.g. a website), through which a user can use an internet-connected personal computing device to access and manage his account.

The system according to one embodiment of the present disclosure may also be configured to allow users to perform normal financial operations, including banking operations and electronic ticketing etc. Optionally external financial entity may be involved to hold the value in escrow until a transaction is closed.

Value may be introduced into the system via cash, check, or virtually any other methods that are acceptable in common business practices. Values may be withdrawn from the system in similar forms.

In one method of the present disclosure, a payee may use a payment coupon to preset some features of a transaction. A payment coupon includes a reference to the payee. It may also include any of the following optional information: price, product/service involved, expiration date etc. The payment coupon may be presented to a payer using a communication media. For instance, it may be displayed as a graphic code on a digital device or on paper, or it can be transmitted to the payer's personal payment device using a wireless connection. The user may initiate a value-sending request by redeeming a payment coupon. Virtually any information that facilitates or promotes a financial transaction in common business practices may be incorporated into a payment coupon.

In alternative embodiment of the disclosure, a system described herein may be used for forms of communication other than value exchanges. For instance, the system may be used to distribute to client computing devices a software program that implements the methods of this disclosure.

An Embodiment of a System for Facilitating a Secured Value Transfer

FIG. 1 is a block diagram depicting a system for facilitating a secured value transfer among users using limit-use encrypted code, in accordance with an embodiment of the present disclosure. Alternative embodiments of the disclosure may incorporate any subset of the components of the illustrated system.

The system of FIG. 1 includes a plurality of system servers (101). For clarity, components of same type and usage are represented by one instance. For example, element 101 represents a plurality of system servers. A system server (101) may be connected to a plurality of financial servers (102) and a plurality of databases (103). The connection may be implemented using various communication technologies, e.g. Ethernet, Fiber Optical Channel, etc. A subset of system servers (101) may also serve as a communication gateway and may be connected with a payer's (106) and a payee's (107) personal computing devices. Personal computing devices may be any computing devices used by users to execute their computational tasks, in accordance with methods of the present disclosure. Payer's (108) and payee's (109) personal payment devices may be a subset of personal computing devices used by payers and payees to execute their computational tasks during value-transfer transactions. A solid line represents a connection during a transaction, whereas a dash line represents a connection that is not required during a transaction but may be requested prior to or after a transaction.

System servers (101) may register users and perform other system tasks, in accordance with methods of the present disclosure. These tasks may include (a) obtaining the payer decryption apparatus; and (b) receiving, decrypting, and validating requests; and (c) conducting a value-transfer transaction. Depending on the configurations of value-transfer transactions, task (c) may be carried out in collaboration with additional servers such as financial servers (102). Physically system servers (101) may comprise a plurality of inter-connected computer servers. In one embodiment of the present disclosure, system servers (101) may also host a website. The website may serve as a portal whereby a user can access and manage his account.

Databases (103) may serve as a persistent data storage that can record and retrieve data related to the value transfer. They may store users' account information as well as information that are persistent across different sessions and transactions. User information may include user identification and contact information (e.g. name, email address), transaction record, account balance, preferred communication settings, or cryptography apparatuses. Database (103) may be implemented using different forms and technologies, for example, using a centralized architecture design or a distributed design where the data is partitioned and distributed into multiple networked computers to improve performance.

When values being transferred are in a financial form, additional servers may be involved as financial servers (102). These financial servers communicate with financial institutions (105) and initialize financial transaction to transfer values. Financial server (102) may communicate with financial institution (105) to inject values to or extract them from the system. Since the methods in present disclosure may be used for transferring virtually any form of values, financial servers (102) shall be broadly interpreted as servers that execute value-transfer transactions.

Users deploy various personal computing devices (106 and 107) to fulfill their tasks, in accordance with methods of the present disclosure. Virtually any computing device with a plurality of processors and/or a storage storing instruction may be used as personal computing devices. The illustrative system in FIG. 1 lists some examples, including personal computing devices used by payer (106) and by payee (107) to communicate with system servers (101), as well as personal payment devices used by a payer (108) and by a payee (109) in a value-transfer transaction. A variety of computing devices may be used as client computing devices, including Smart phones, Personal Data Assistants (PDAs), and other mobile computing devices, provided that the devices possess hardware and/or software suitable for fulfilling tasks defined in methods of the present disclosure.

A payer may use a personal payment device to create and encrypt a value-sending request. The encrypted value-sending request may then be transmitted to a payee's personal payment device. Transmission may be conducted through virtually any communication media using direct or indirect links. In one embodiment of the present disclosure, the request may be transmitted using near-field communication (NFC), which is a peer-to-peer wireless connection. In another embodiment of the present disclosure, the request may be encoded as a graphic code, for instance, Quick Response (QR) code, and scanned into a payee's personal payment device.

In one method defined in the present disclosure, a payee's personal payment device (109) receives an encrypted request from payer's personal payment device (108). The payee's client computing device (109) may be connected to a system server (101) during a transaction. The payee may use his personal payment device (109) to forward the request to the system server (101). In one method of the present disclosure, payer's PIN may be used as a second form of authentication. Payee's client computing device (109) may be capable of displaying a message that requests the payer for her PIN. It may also have an input device whereby the payer may enter her PIN.

Illustratively an entity operating the value transferring system may act as a Certificate Authority and certify individual users, while certificated users may in turn certify individual transactions using encrypted value-sending requests. Certified users may be issued with identity certificates for use in value transferring transaction.

Figure 2:
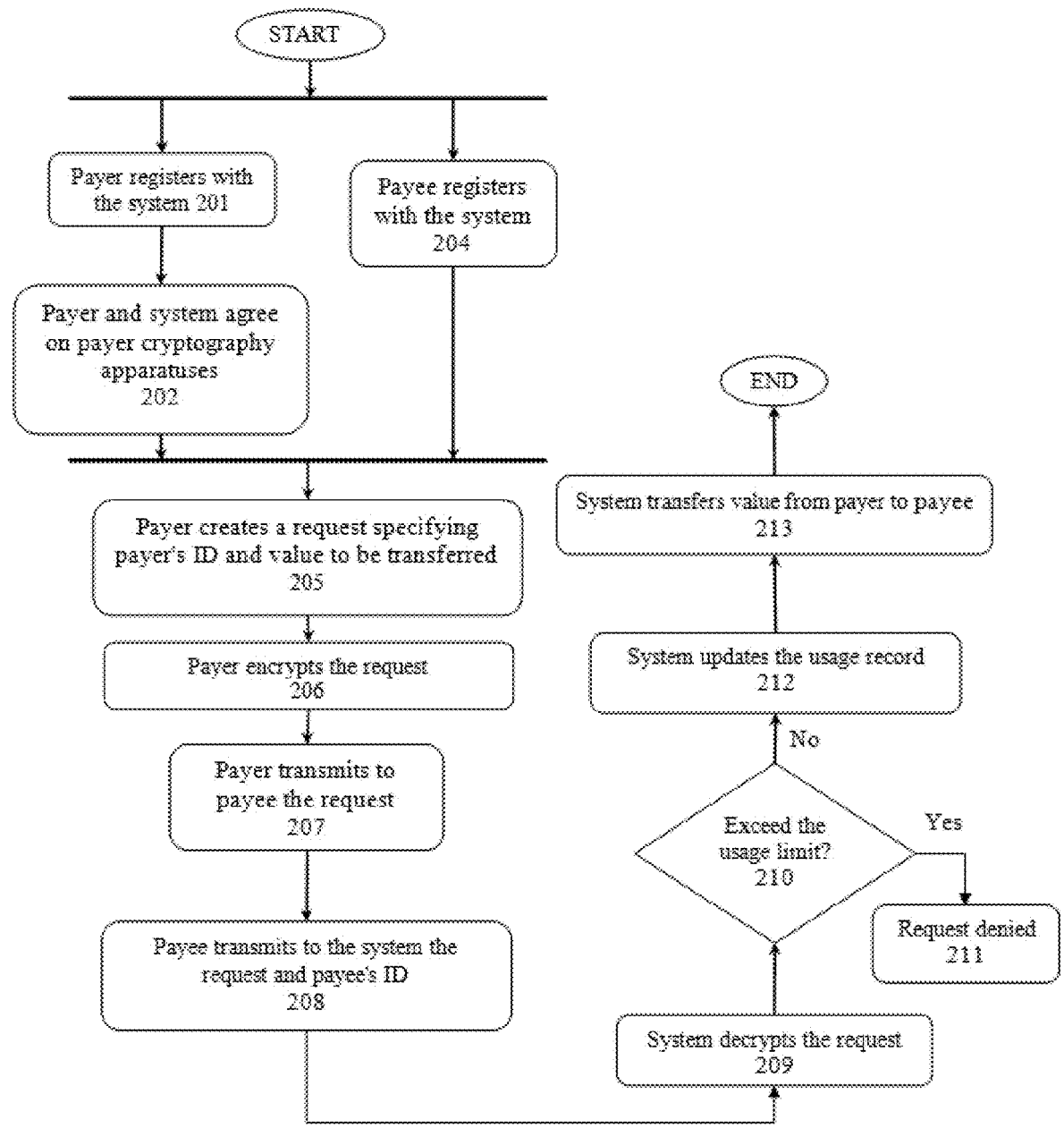
FIG. 2 is a flow graph depicting one method of securely transferring values among users using limit-use encrypted code, in accordance with an embodiment of the present disclosure.

One Method of Securely Transferring Values Between Users Using Limit-Use Encrypted Code With reference now to FIG. 2, an illustrative method of transferring a value securely in accordance to one embodiment of the present disclosure. The illustrated method may be used with the system depicted in FIG. 1.

Prior to a transaction, users register with the system. User registration process may be carried out concurrently by individual users with no particular order: a payee registers with the system in state 201, and a payer registers with the system in state 204. During the registration a user may be assigned with a unique record. The record, referred to as user ID, identifies the user within the system. In state 202 the payer agrees with the system on cryptographic apparatuses, referred to as payer cryptography apparatuses. The cryptography apparatuses may come in form of a pair of a decryption apparatus and an encryption apparatus. Virtually any form of cryptography apparatuses may be used with this method of secured value transfer, given that a message encrypted with an encryption apparatus may be decrypted with a decryption apparatus within reasonable time and resources. The cryptography apparatuses may be implemented as software program, hardware logic, or any combination of both. The process of reaching an agreement may involve the communication between the payer and the system, or though a third party as an authentication authority. In one implementation of this method, the cryptography apparatuses may be implemented using an asymmetric cryptographic algorithm, also known as a public-key cryptographic algorithm, such as one defined by Data Encryption Standard (DES). In this implementation, a pair of the public and private keys are generated using the asymmetric cryptographic algorithm. The public key $K_{public}$ may be stored on a system server and the private key $K_{private}$ may be stored on the payer's personal payment device. In another implementation of this method, the cryptography apparatuses may be implemented using a symmetric cryptographic algorithm. In this implementation, a cryptographic key may be generated using the symmetric cryptographic algorithm. The key may be stored both on a system server and on the payer's personal payment device.

A payer initiates a transaction by creating a value-sending request in state 205. The request may include payer's user id and other information from which the amount of value being transferred may be calculated. In state 206 the payer encrypts the value-sending request using a payer cryptography apparatus. In one implementation of this method, the payer encrypts the value-sending request using the payer's private key $K_{private}$. In state 207 the payer sends the encrypted request to the payee.

Once receiving the encrypted request from the payer, in sate 209 the payee sends to the system the request and the payee's user ID.

After receiving the request via the payee, in state 209 the system decrypts the request, using a payer cryptographic apparatus. In one implementation of the method, the request may be decrypted using the payer's public key $K_{public}$. In state 211 the system server checks the usage of the value-sending request. If it reaches its usage limit, then the request will be denied. Otherwise, the system server updates the usage record for the request in state 212, and transfers the value from the payer to the payee in state 213.

Figure 3:
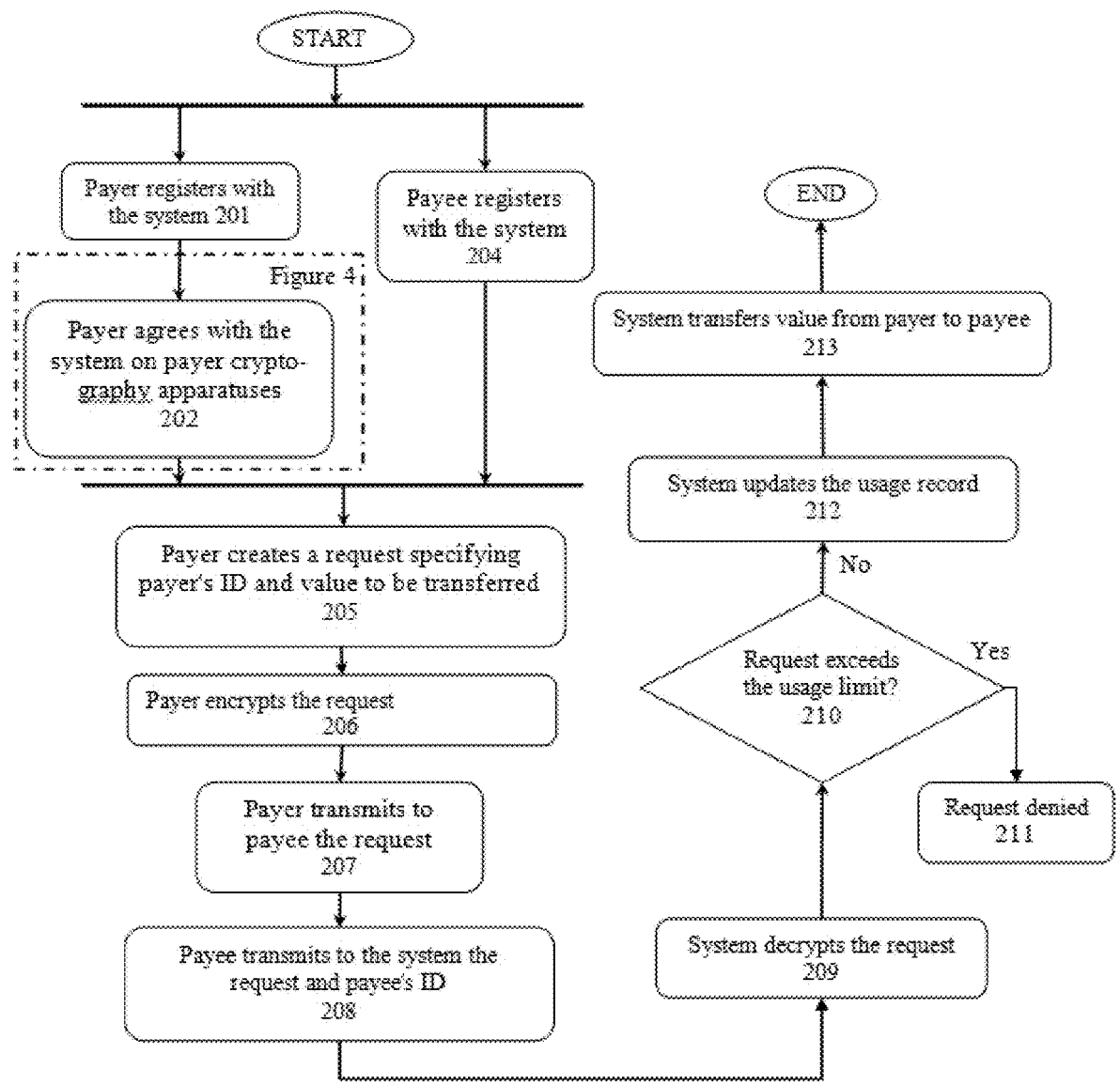
FIG. 3 is a flow graph depicting one method of securely transferring values among users using limit-use encrypted code, wherein payer cryptographic apparatuses are implemented as cryptographic algorithms and a pair of decryption and encryption keys.
Figure 4:
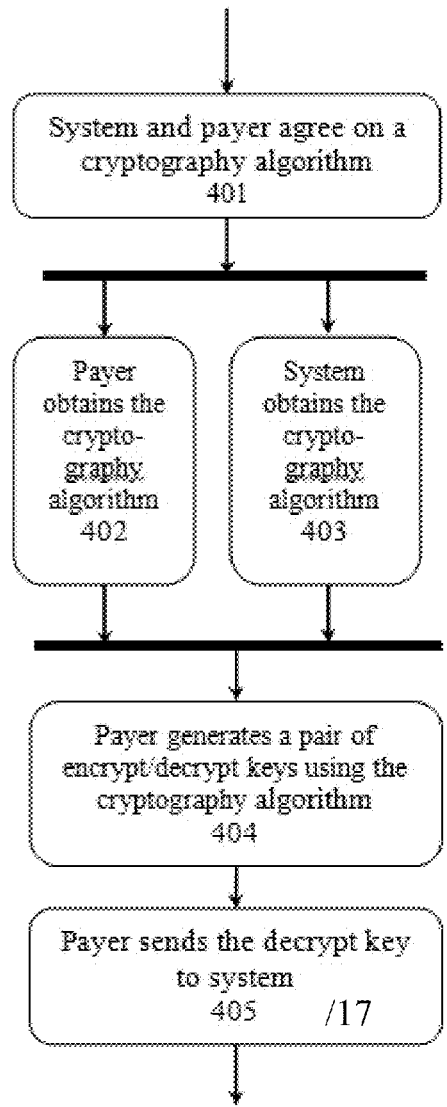
FIG. 4 is a flow diagram providing an enlarged view of the method used in FIG. 3 by the system and a payer to agree on payer cryptographic algorithms and a pair of payer decryption and encryption keys.
Figure 5:
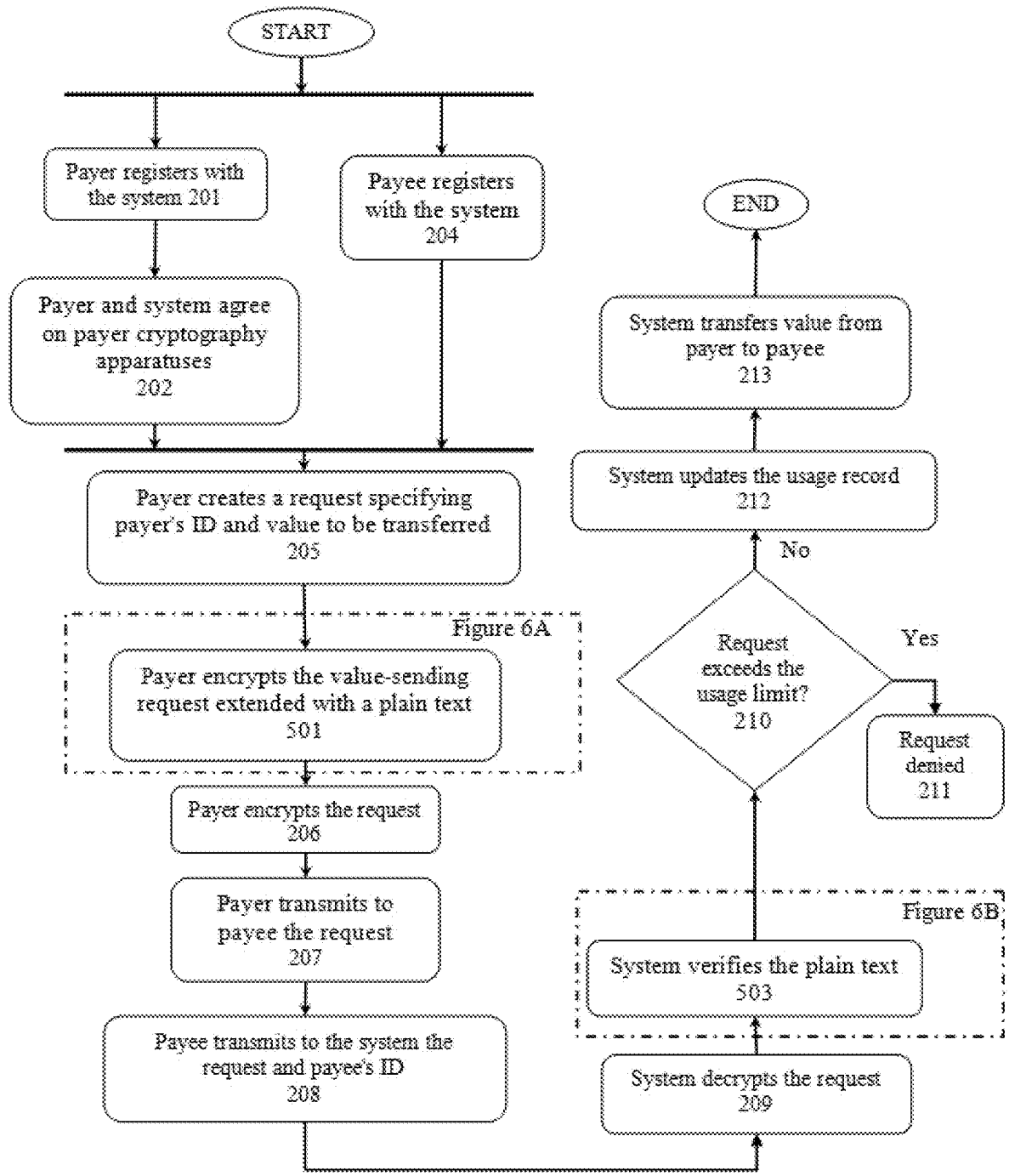
FIG. 5 is a flow graph depicting one method of securely transferring values, wherein a payer can send a payee a verifiable plain text attached to a request.
Figure 7:
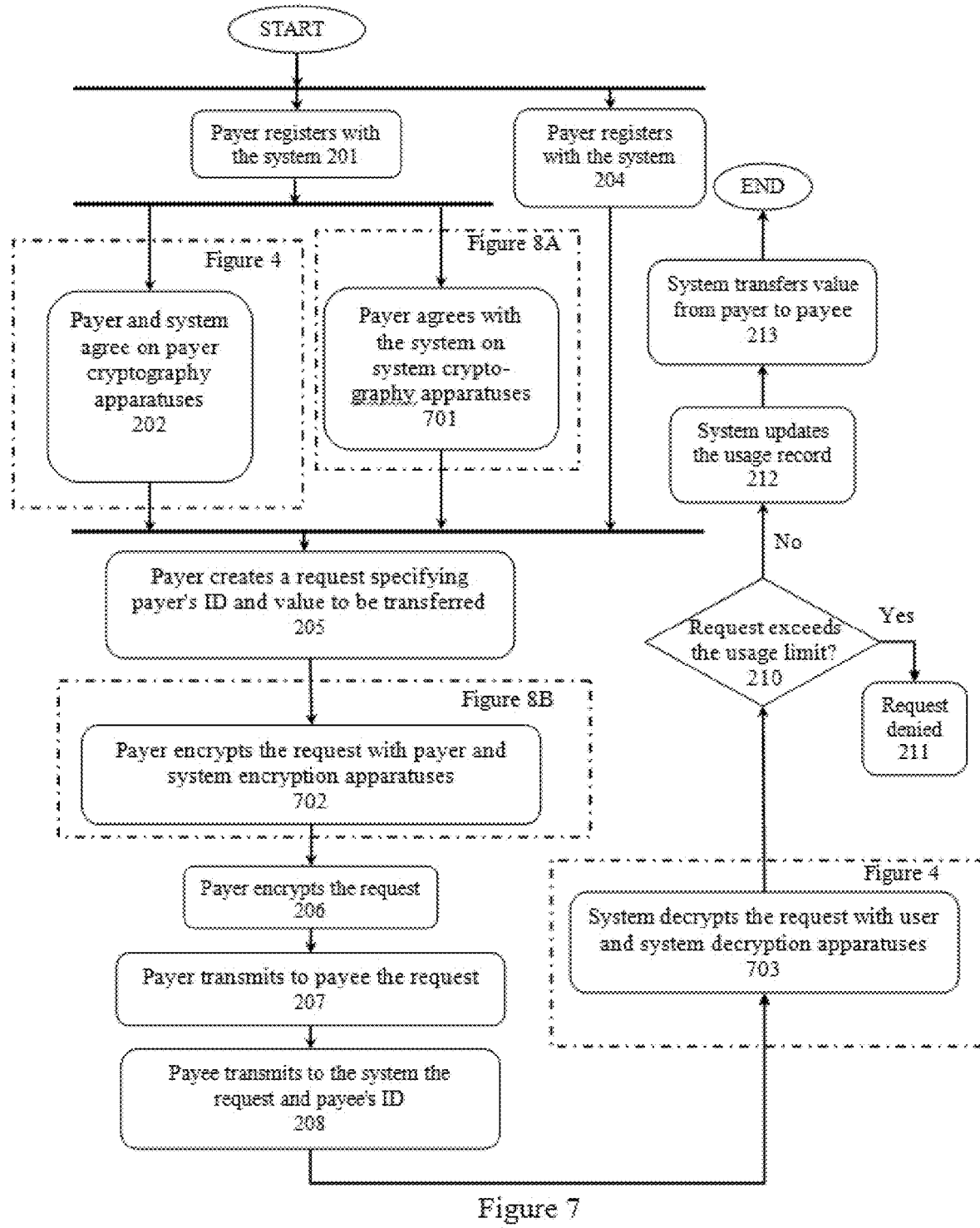
FIG. 7 is a flow diagram depicting one method of securely transferring values, wherein system cryptographic apparatuses are used to protect payer's user id.
Figure 9:
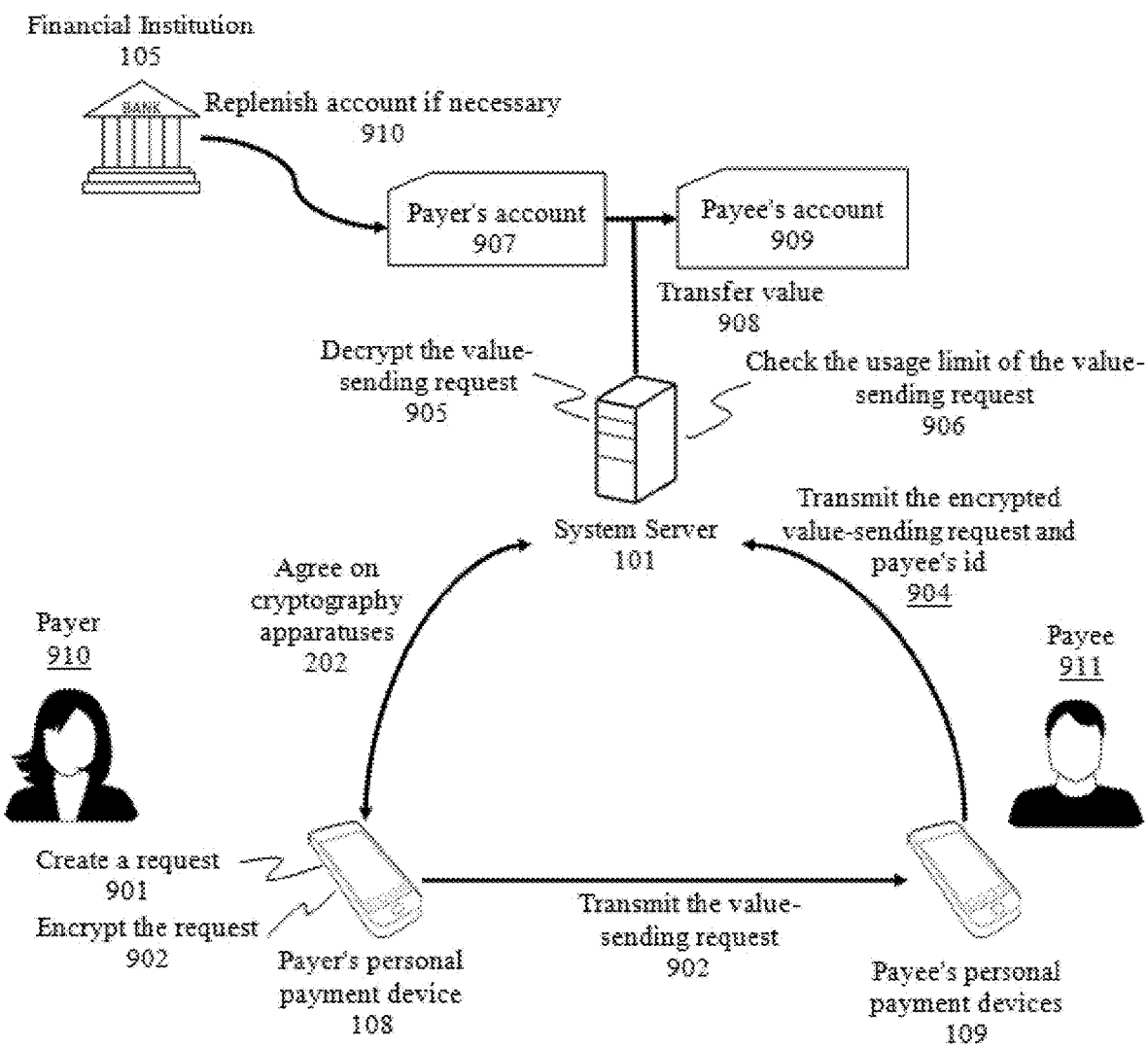
FIG. 9 depicts one form of conducting a secured value transfer from a payer to a payee, in accordance with an embodiment of the present disclosure.
Figure 10:
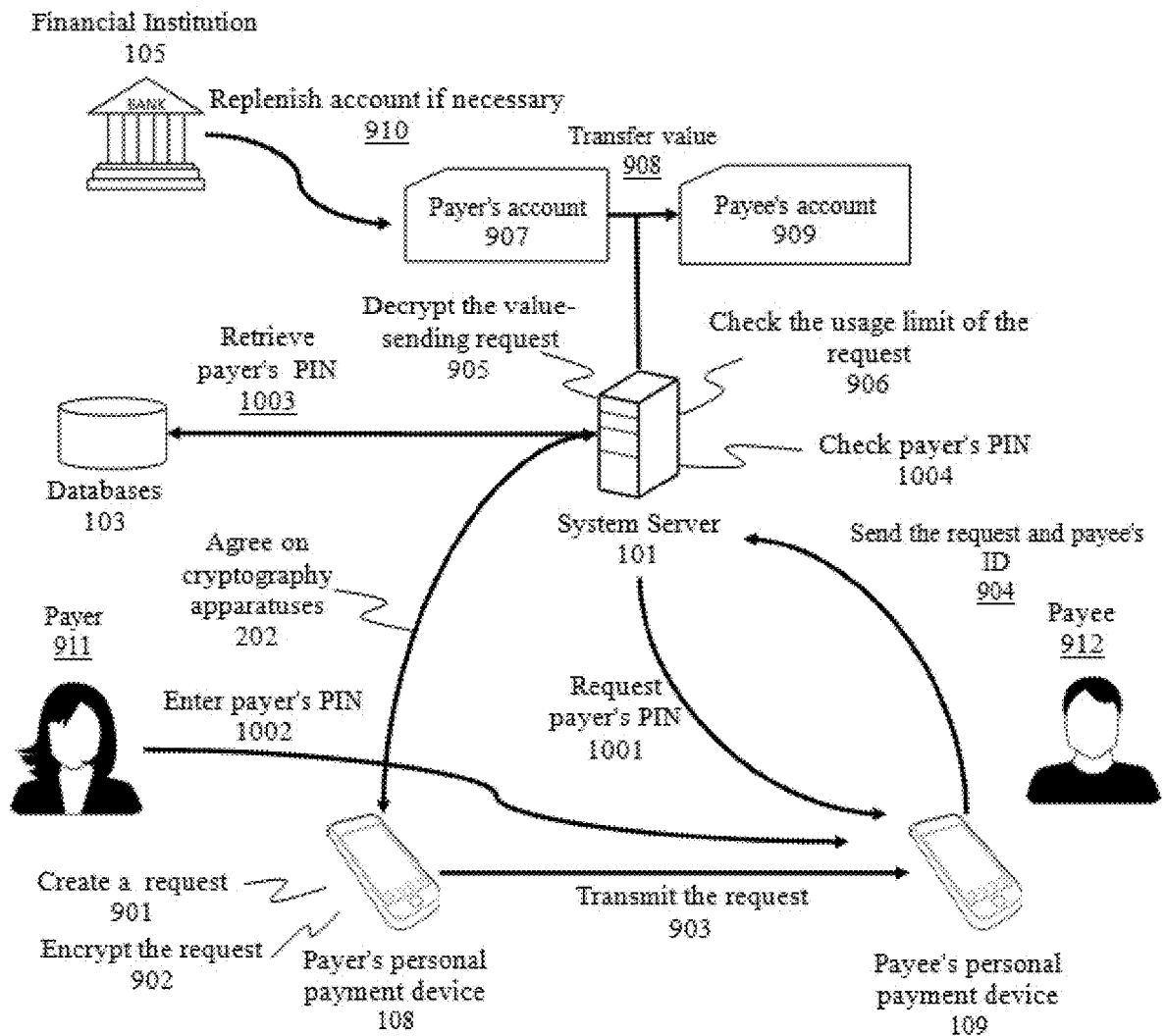
FIG. 10 depicts one form of conducting a secured value transfer with a payer's PIN, in accordance with an embodiment of the present disclosure.
Figure 11:
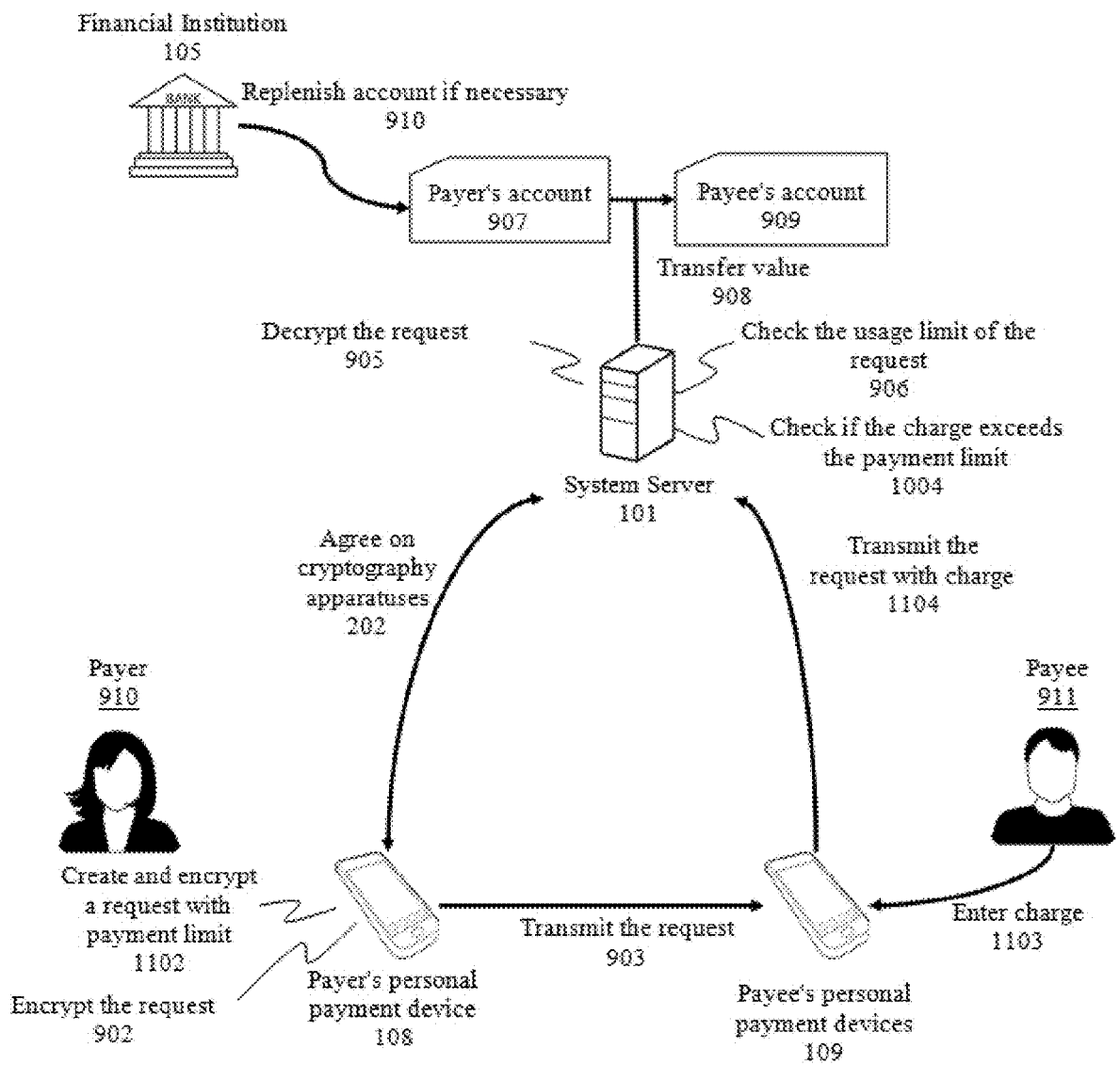
FIG. 11 depicts one form of conducting a secured value transfer, wherein a payee specifies the value being transferred and a payer sets the limit for values to be transferred, in accordance with an embodiment of the present disclosure.
Figure 12:
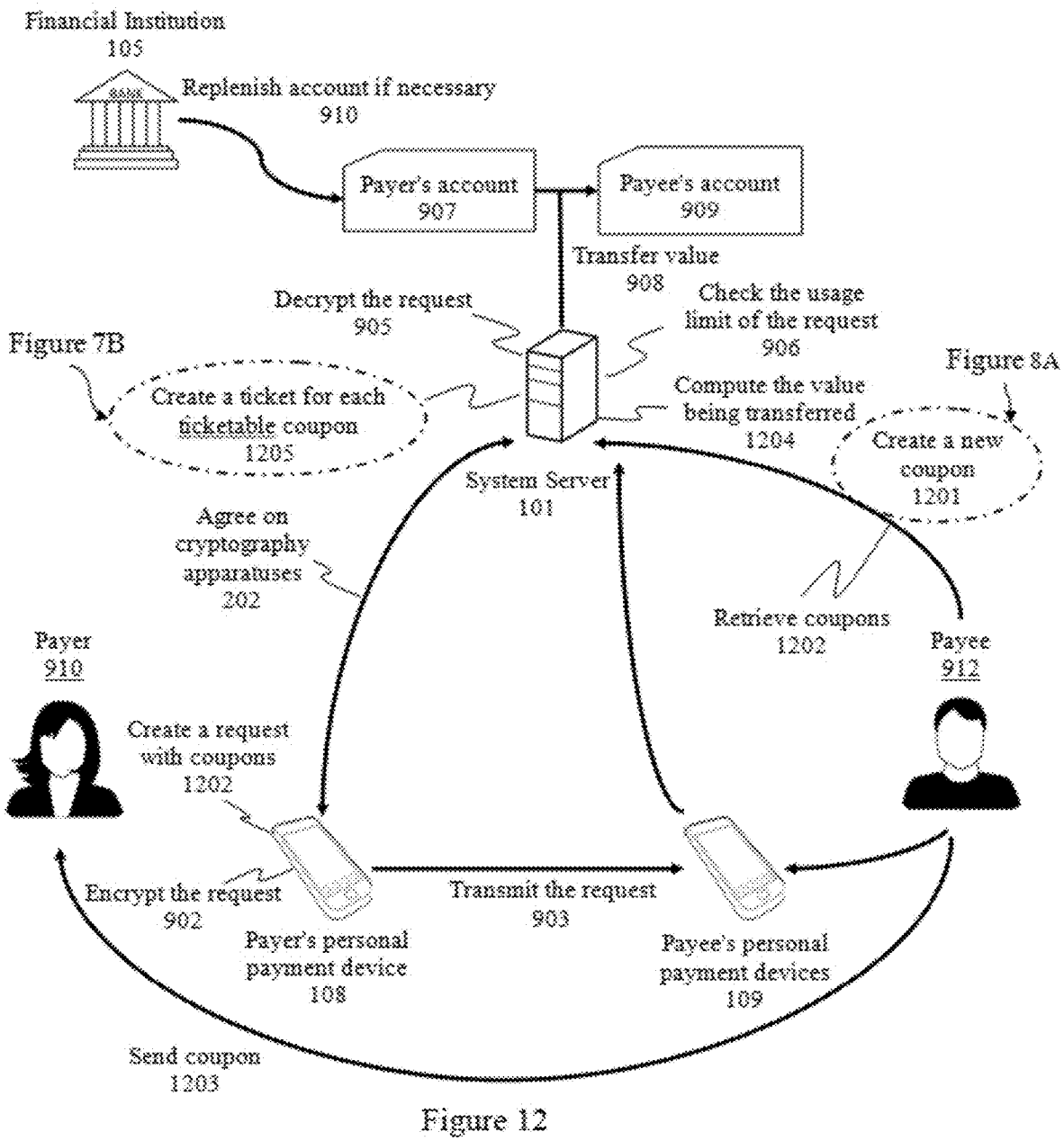
FIG. 12 depicts one form of conducting a secured value transfer wherein a payer redeems a coupon provided by a payee and a ticket is created after the value transfer, in accordance with an embodiment of the present disclosure.
Figure 16:
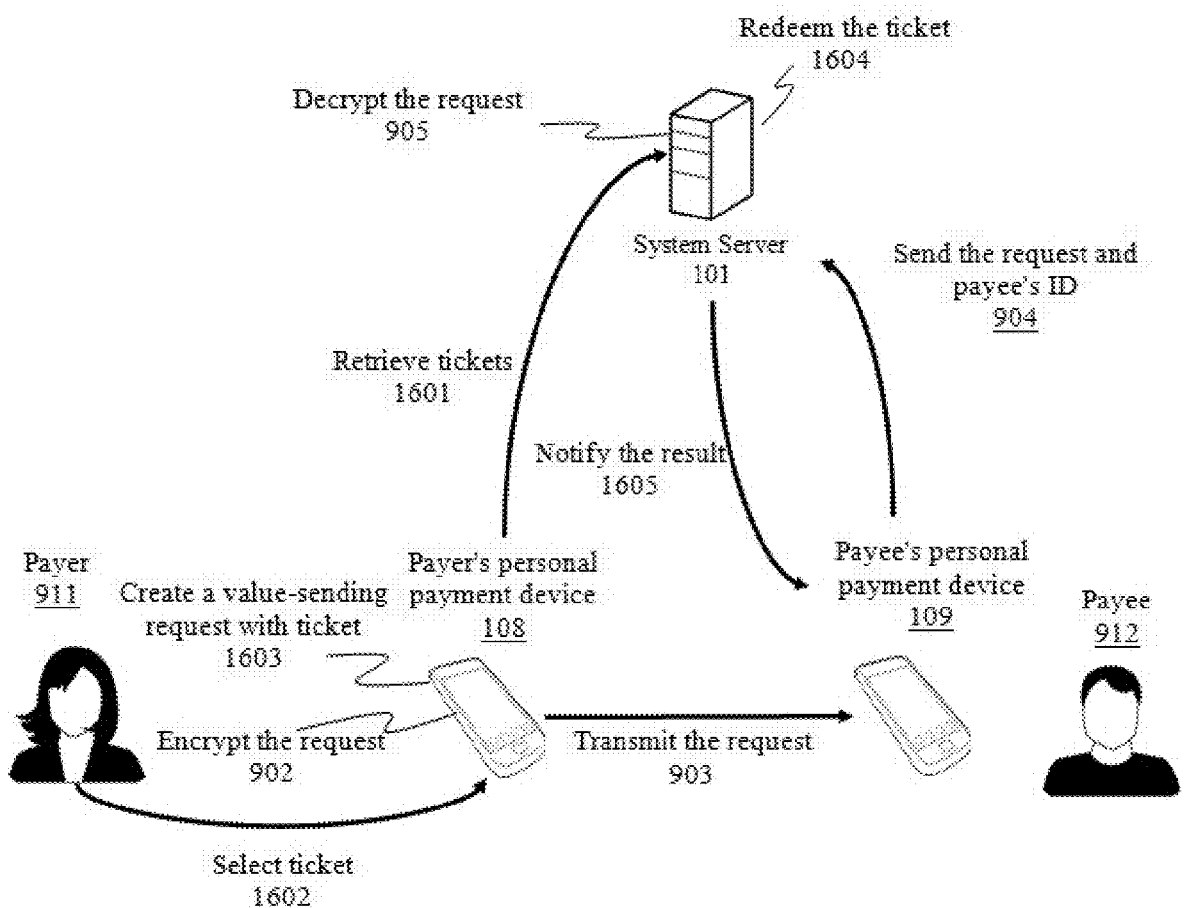
FIG. 16 depicts one form of redeeming a ticket using a method of conducting a secured value transfer, in accordance with an embodiment of the present disclosure.
Figure 17:
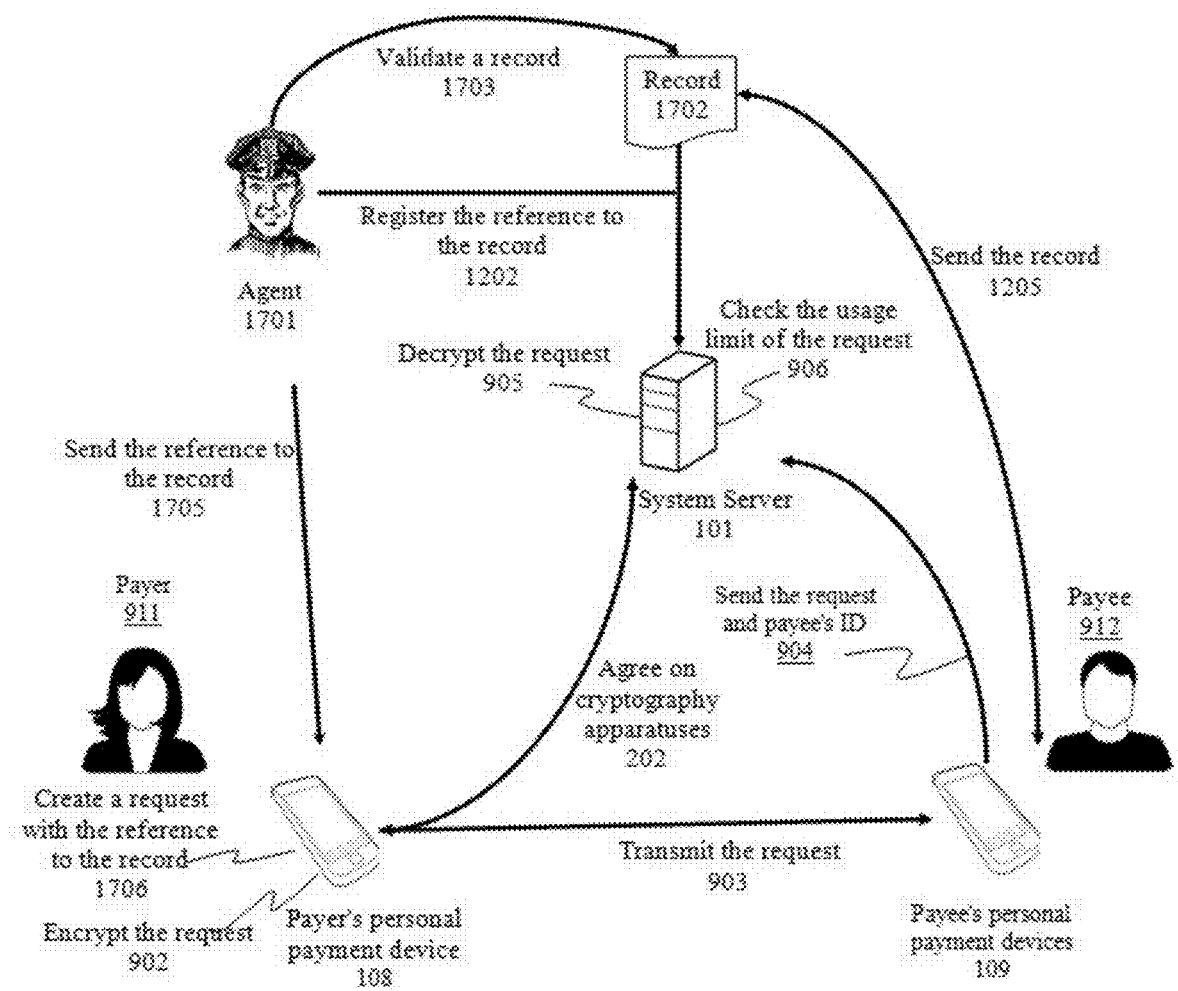
FIG. 17 depicts one form of transferring a validated record using a method of conducting a secured value transfer, in accordance with an embodiment of the present disclosure.

The rest of the description will be organized as follows: FIG. 2 illustrates a method of securely transferring a value among users with limit-use code, in accordance with one embodiment of the present disclosure. Various variants may be extended from this method. FIG. 3 depicts an embodiment of the method in which payer cryptographic apparatuses are implemented using an asymmetric cryptographic algorithm and a pair of private and public keys. FIG. 5 extends the method of FIG. 2 with additional steps that allows a payer to send out a verifiable plain text. FIG. 7 adds additional steps and means whereby additional cryptographic apparatuses are used to protect the payer's identity. FIGS. 9-17 depict several embodiments of the present disclosures, using variants of methods depicted in FIGS. 2-7 and variants of the system depicted in FIG. 1. FIG. 9 depicts an embodiment of the present disclosure, using a variant of the method depicted in FIG. 2 and the system depicted in FIG. 1. FIG. 10 extends the embodiment depicted in FIG. 9 with additional steps and means that enable the use of a Personal Identification Number (PIN) as an additional authentication method. FIG. 11 adds additional steps and means whereby a payee proposes value being transferred and a payer sets a limit for the value. FIG. 12 extends the embodiment depicted in FIG. 9 with additional steps and means that enable the use of coupons and tickets. FIG. 14 adds additional steps and means that enable the use of coupons encoded in a graphic code, for example, in the Quick Response (QR) code. FIG. 16 adds additional steps and means that enable the redemption of a ticket. Finally, FIG. 17 depicts an embodiment of the present disclosure, wherein the value being transferred is a record validated by a third user.

It shall be noted that additional steps and means defined in these methods and embodiments may be combined to form a new method or an embodiment. Such extension and combination will be readily apparent to those having ordinary skill in the art, and the general principles defined herein may be applied to other methods and embodiments without departing from the spirit and scope of the present disclosure. Thus, the present disclosure is not intended to be limited to the methods and embodiments shown, but is to be accorded in the widest scope consistent with the principles and features disclosed herein.

One Method of Securely Transferring Values with Private-Public Key Exchange

FIG. 3 illustrates a method of secured value transfer wherein payer cryptographic devices may be provided in a form of an asymmetric cryptographic algorithm and a pair of encryption and decryption keys. With reference now to FIG. 4, illustrating the details of a method used by a payer and the system to exchange private and public keys.

Before the key exchange, the system and a payer agree on a cryptography algorithm (401). There may be many ways to reach such an agreement: in one embodiment of this method, the cryptography algorithm is selected by developers of the system. In another embodiment of the method, the agreement may be reached through a negotiation between a payer and the system. After an agreement is reached, the payer and the system obtain an implementation of the cryptographic algorithm (402 and 403). There are many ways for the payer and the system to obtain an implementation of the algorithm: the algorithm may be implemented on the payer's personal payment device as well as on a system server, or, the payer and the system may download the implementation from a public domain.

After obtaining an implementation of the cryptographic algorithm, the payer uses it to generate a pair of encryption (private) key and decryption (public) key (404). The payer then sends the decryption key to the system (405). The payer uses the encryption key with the cryptographic algorithm to encrypt a value-sending request (206 in FIG. 3), and the system uses the payer decryption key with the cryptographic algorithm to decrypt the request, received via the payee (209 in FIG. 3).

One Method of Securely Transferring Values with Verifiable Plain Texts

With reference now to FIG. 5, illustrating a method of securely transferring a value wherein a payer may also send out a verifiable plain text. This additional capability enables a payer to attach with a request a message accessible to a payee, and the message may be validated by the system to make sure that it is not altered in any way by the payee or others.

One application of a verifiable plain text is to allow a payer to communicate with a payee terms associated with underlying value-transfer transaction. A payee may read these terms in a verifiable plain text, and if he agrees with these terms, he can forward the request to the system for the further process. The system can then verify the integrity of the plain text attached with the request forwarded by the payee. The system may use the verifiable plain text as evidence showing that the payee agrees the terms described in the plain text attached with the request.

The method in FIG. 5 extends the method in FIG. 2 with three steps: at step 501 the payer encrypts the request and attaches a plain text to the request, wherein the encrypted request contains the information for verifying the integrity of the plain text; at step 502 the payee accesses the plain text attached to the request; at step 503 the system uses the information contained in the request to verify the attached plain text.

With the reference now to FIG. 6A, providing enlarged views of step 501 in FIG. 5. At step 601 the payer computes a record d from the plain text. The record, referred to as a digest, is used to validate the plain text. There are various methods that may be used for computing a digest of a plain text. If two texts are different, their digests are also different. In some applications, for performance consideration, the digests of two different texts are different with a high probability. Examples of methods computing digests include SHA family of cryptographic hash functions. After computing the digest, the payer adds the digest into the request at step 602, and uses the payer encryption apparatus to encrypt the request at step 603. The payer then attaches the plain text to the request at step 604.

With the reference now to FIG. 6B, providing an enlarged view of step 503 in FIG. 5. After decrypting the request at step 210 (FIG. 5), the system extracts the digest from the request at step 605, and uses the digest to validate the plain text attached to the request at step 606. The validation process usually involves in computing a digest of the plain text attached to the request, and then checking whether it is consistent with the digest contained in the request. If the validation fails, the system exits from the workflow, indicating that the plain text is corrupted at step 607.

One method of Securely Transferring Values with System Cryptographic Apparatuses With reference now to FIG. 7, illustrating a method of securely transferring a value, wherein system cryptography apparatuses are used in addition to payer cryptography apparatuses. System cryptography apparatuses allow users to communicate with the system securely without using user-specific payer cryptographic apparatuses. One use of system cryptographic apparatuses is to encrypt payer's identity in a multiple user environment. In an application where multiple users are registered with the system, the system associates a payer decryption apparatus with the payer's user ID. In this environment, the system uses a payer's user ID to retrieve the payer's decryption apparatus. Therefore, the information on the payer's user ID is attached to a request, and it has to be accessible to the system. The system cryptography apparatus provides a means to encrypt and decrypt the payer's ID without resort to user-specific payer cryptography apparatuses.

The method of FIG. 7 extends the method of FIG. 3 with the following steps: in addition to agreeing on payer cryptography apparatuses, the system and the payer also agree on system cryptographic apparatuses at step 701. The payer encrypts the request with both payer and system encryption apparatuses at step 702. The system decrypts the request with both user and system decryption apparatuses.

Figure 8A:
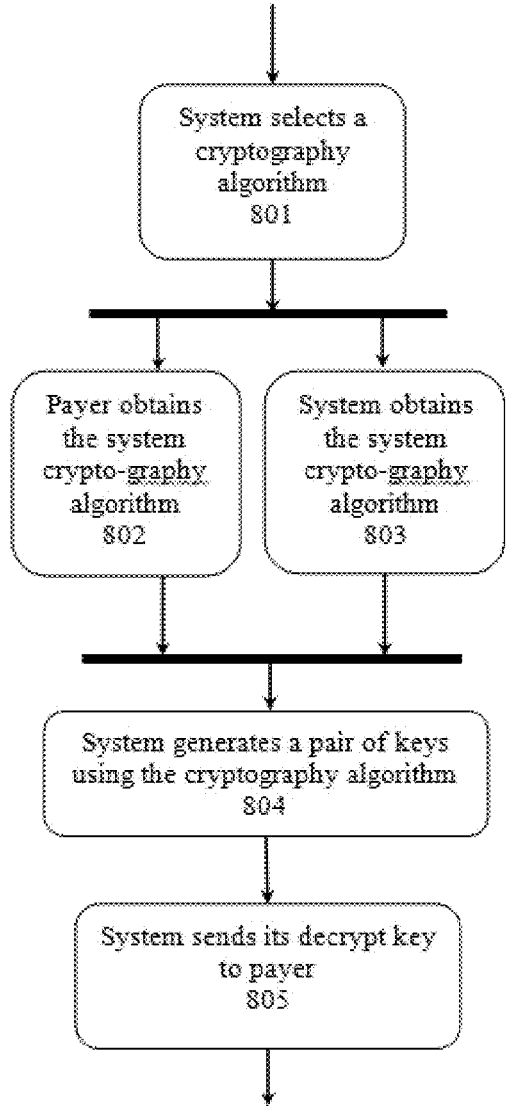
FIG. 8A is a flow diagram providing an enlarged view of the method used in FIG. 7 by the system and a payer to agree on system cryptographic algorithms and a pair of system decryption and encryption keys.

With reference now to FIG. 8A, providing an enlarged view of the agreement on the system cryptographic apparatuses at step 701. The system selects a cryptography algorithm at step 801. The payer and the system then obtain the cryptography algorithm at step 802 and at step 803, respectively. The approaches of obtaining a system cryptography algorithm is similar to those of obtaining a payer cryptography algorithm. For example, the algorithm may be implemented on the payer's personal payment device and on a system server, or it may be downloaded from a public domain. The system then generates a pair of public and private key using the system cryptography algorithm, and sends the public key to the payer as the system encryption key at step 805.

Figure 8B:
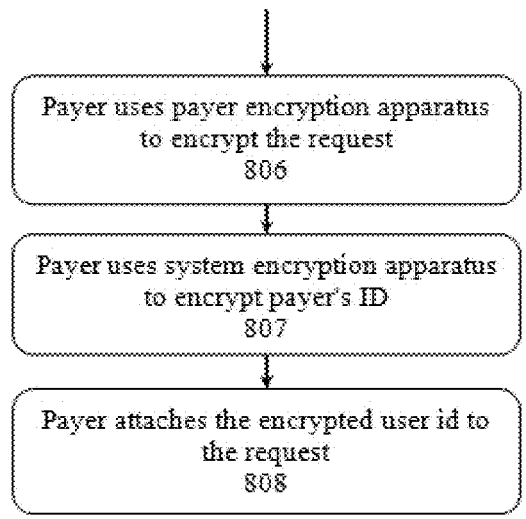
FIG. 8B is a flow diagram providing an enlarged view of the method used in FIG. 7 to encrypt payer's user id using the system encryption algorithm and key.

With reference now to FIG. 8B, providing an enlarged view of encrypting a value-sending request with payer and system encryption apparatuses at step 702. The payer uses payer encryption apparatus to encrypt the request at step 806. The payer then uses the system encryption apparatus to encrypt the payer's user ID at step 807, and attaches the encrypted user id to the encrypted value-sending request at step 808.

Figure 8C:
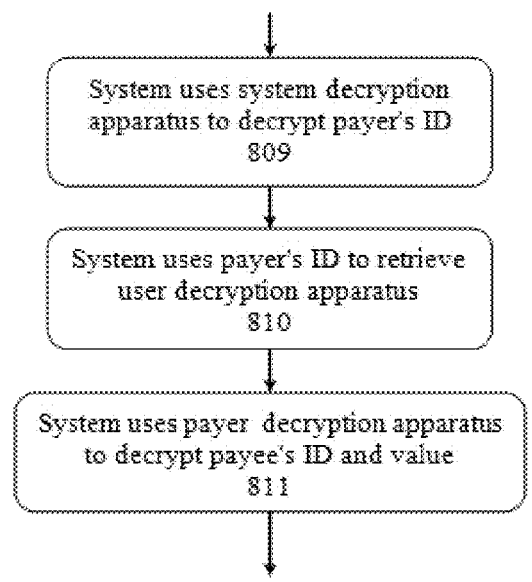
FIG. 8C is a flow diagram providing an enlarged view of the method used in FIG. 7 to decrypt payer's user id.

With reference now to FIG. 8C, providing an enlarged view of encrypting a value-sending request with payer and system encryption apparatuses at step 703. At step 809, the system uses the system decryption apparatus to decrypt the payer's user ID attached to the request. At step 810, the system uses the payer's user ID to retrieve the payer decryption apparatus. Finally, at step 811, the system uses the payer decryption apparatus to decrypt the request.

Conducting a Secured Value Transfer with Limit-Use Encrypted Code

With reference now to FIG. 9, illustrating a form of secured value transfer using the method of FIG. 2 and the embodiment of system of FIG. 1. Functions of a payer (911) and a payee (912) are implemented by payer's personal payment devices (108) and payee's personal devices (109).

At step (901) a payer (911) uses her personal payment devices (108) to create and to encrypt a request. The request includes payer's user ID, and the value being transferred. The encrypted request is transmitted from the payer's personal payment devices (108) to a payee's personal payment devices (109). Payee's personal client computing device (108) send to the system server (101) the encrypted request and payee's user ID at step (904). System server (101) decrypts the request at step (905) and checks its usage limit at step (906). After a successful validation on usage limit, the system server (101) initializes the value transfer from the payer to the payee. If necessary, an external financial institution (109) will be contacted to replenish the payer's account at step 910, using payer's financial information.

Conducting a Secured Value Transfer with PIN Authentication

With reference now to FIG. 10, illustrating a form of secured value transfer with additional authentication required using Personal Identification Number (PIN). This method extends the method of FIG. 9 with steps and means for additional authentication using a payer's PIN. For clarity, this description will emphasize on these additional steps and means.

A payer chooses her PIN prior to a transaction, and the system stores her PIN in the databases (103). After receiving a request via a payee, but before conducting the requested transaction, a PIN request may be sent by the system to payee's personal computing device at step 1001. The payee's client computing device displays the request and the payer enters her PIN at step 1002. The payee sends back to the system the received PIN. System server retrieves the payer's PIN at step 1003 and validates the received PIN again the stored PIN at step 1004.

Conducting a Secured Value Transfer Wherein a Payee Specifies a Value being Transferred and a Payer Sets the Limit for the Value With reference now to FIG. 11, illustrating a form of secured value transfer wherein a payee specifies the value being transferred and the payer sets the limit for the value. This method extends the method of FIG. 3 with steps and means that enable the payee to specify the amount of the value being transferred and the payer to set the limit for the value being transferred. For clarity, this description will emphasize on these additional steps and means.

At step 1102 the payer creates and encrypts a value-sending request. Instead of specifying the value being transferred in the request, the payer specifies in a request a limit for the value that may be transferred. After receiving the request from the payer, the payee enters the value to be transferred, referred to as "charge", at step 1103. At step 1104 the payee sends to the system the request received from the payer, the payee's user ID, and the charge entered by the payee. At step 1104 the system checks whether the charge exceeds the limit specified in the request, and rejects the transaction if so.

Conducting a Secured Value Transfer Wherein Coupons are Used to Preset Values being Transferred With reference now to FIG. 12, illustrating a form of secured value transfer wherein a payee uses a coupon to preset the value being transferred and the payer initializes value-sending request by redeeming the coupon. The transaction flow in FIG. 12 extends that of FIG. 2 with steps and means for creating and redeeming a coupon. An optional ticket may also be generated as a proof of the transaction. For clarity, this description will emphasize on these additional steps and means.

At step 1201 the payee uses the system to create a record that specifies the value being transferred. A reference to the record, referred to as a "coupon", may be sent to the payer at step 1203. The payer may redeem the coupon by including it in a request. At step 1202 the payer creates and encrypts a request, which includes a plurality of coupons. After receiving a value-receiving request and decrypting the value-sending request in it, the system computes the value being transferred in step 1204. Upon a successful value-transfer transaction, the system creates a ticket for each "ticketable" coupon.

Figures 13A, 13B:
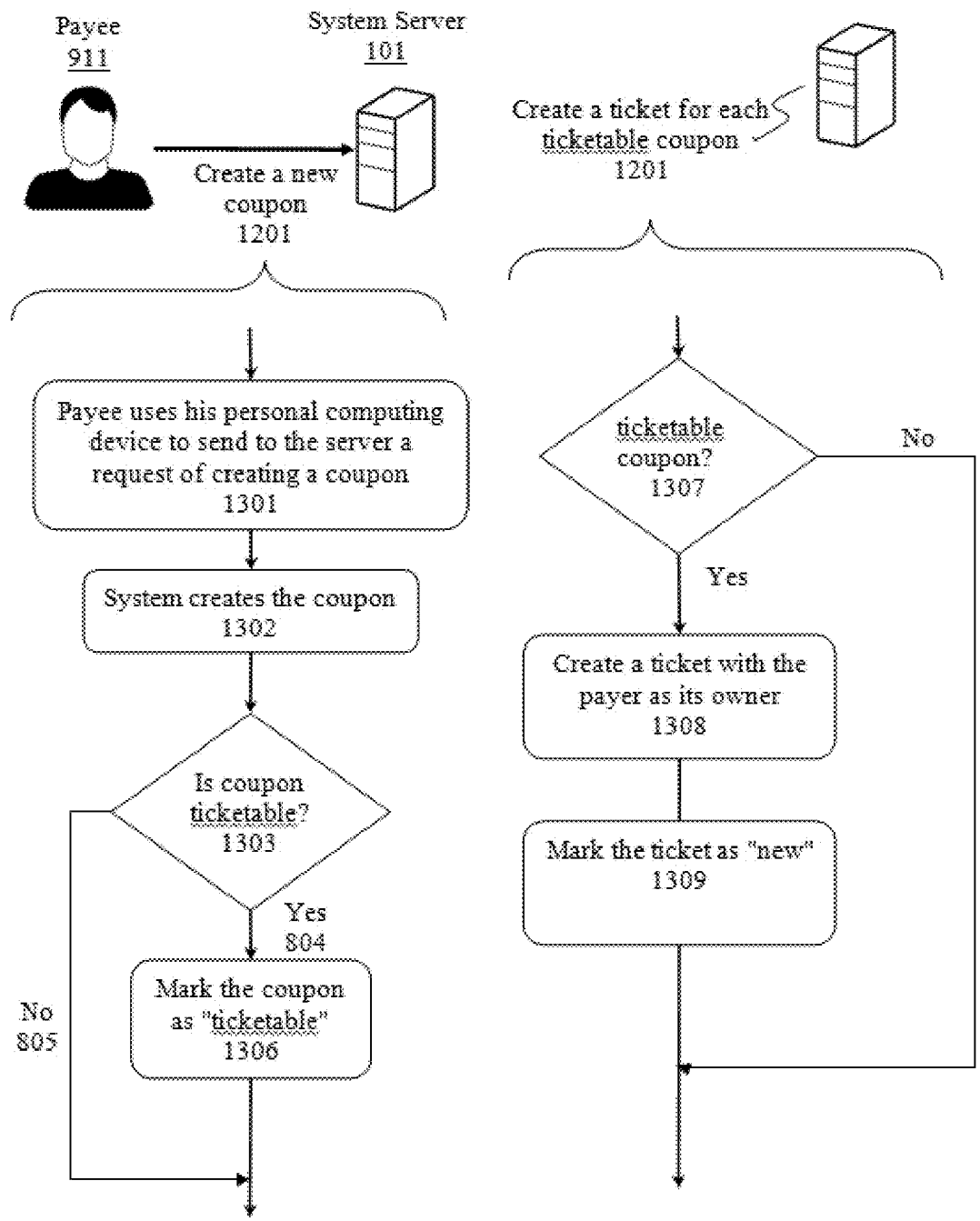
FIG. 13A is an enlarged view of the method used in FIG. 12 to create a coupon.
FIG. 13B is an enlarged view of the method used in FIG. 12 to create a ticket.
Figure 14:
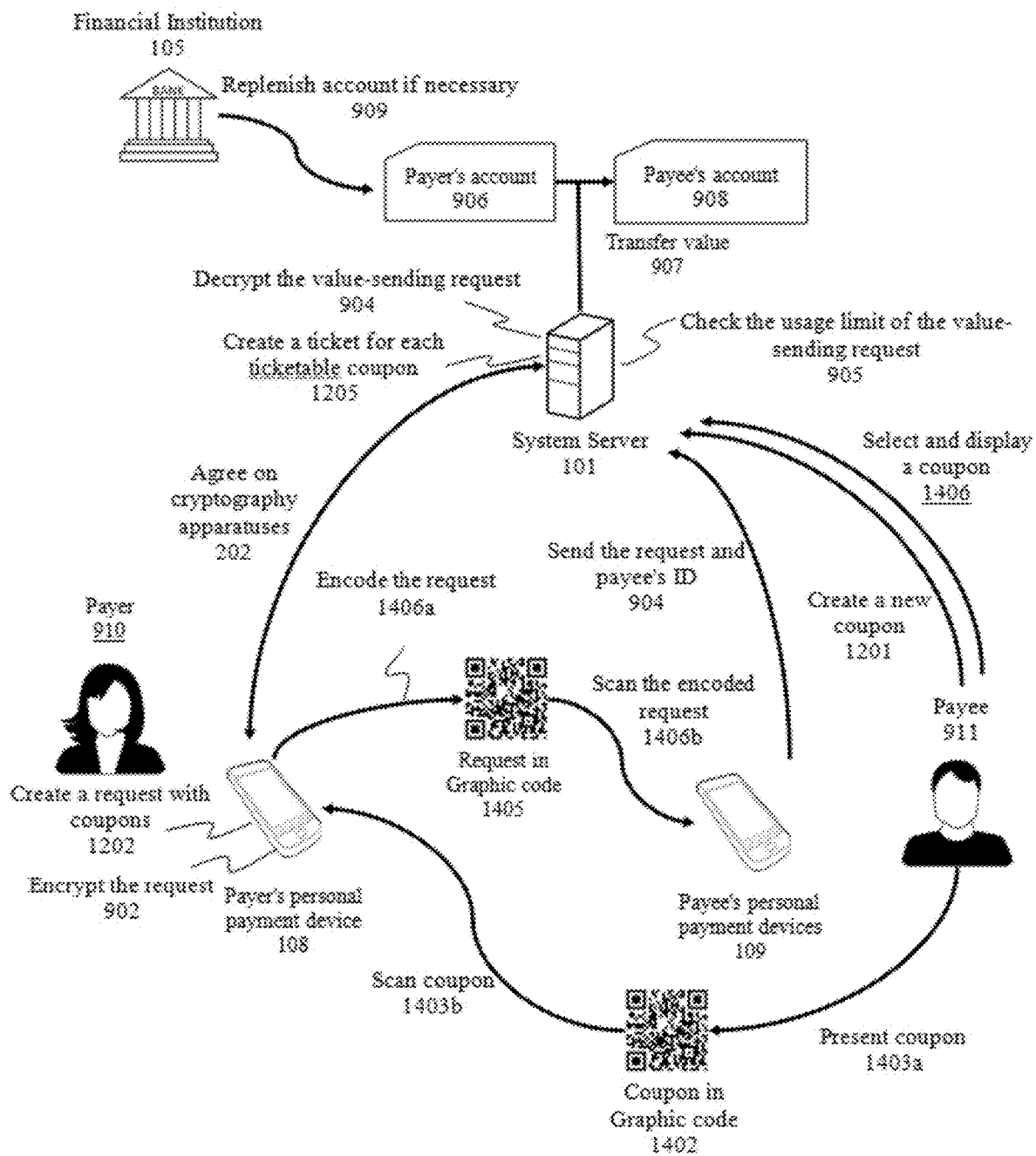
FIG. 14 depicts one form of conducting a secured value transfer wherein a payer redeems a coupon in a graphic code presented by a payee, in accordance with an embodiment of the present disclosure.

With the reference now to FIG. 13A, providing an enlarged view of creating a coupon at step 1201. At step 1301 a payee uses his personal computing device to initialize a request to the system for creating a coupon. The coupon specifies a value being transferred. It may also include optional data such as the information indicating whether a ticket is generated when the coupon is redeemed. Such a coupon is referred to as a "ticketable" coupon in this description. At step 1302 the system creates a record for the coupon upon the request from the payee. If the payee requests a "ticketable" coupon, the system marks new coupon as "ticketable".

With the reference now to FIG. 13B, providing an enlarged view of creating a ticket at step 1205. After a successful value transfer, the system checks the coupons included in the value-sending request. For each of the coupons that are ticketable, the system creates a ticket and marks the payer as its owner at step 1308, and it also marks the ticket as "new" at step 1309.

Conducting a Secured Value Transfer Wherein Communication Between Payer and Payee are Carried Out Through Graphic Codes With reference now to FIG. 14, illustrating a form of secured value transfer, wherein communication between payer and payee are carried out using graphic codes. Examples of graphic coding formats are bar code, Quick Response (QR) code, etc. Communication in a graphic format may be presented on various media suitable for displaying the graphic code. Examples of media include papers, outdoor billboards, and the screens of personal payment devices, etc. The graphic code may be scanned into personal payment devices. The transaction flow of FIG. 14 extends the transaction flows of FIG. 9 and FIG. 12 with additional steps and means that enable communication in graphic code. For clarity, this description emphasizes on these additional steps and means.

Before a value-transfer transaction, a payee sends a payer some coupons through graphic codes. At step 1401 the payer selects and displays a coupon. The payee presents to the payer the coupon encoded in a graphic code (1402) at step 1403a, and at step 1403b the payer scans the coupon using her personal payment device (108). Before starting a value-send request, the payer browses her personal payment devices for scanned coupons and selects those to be redeemed at step 1404. The payer then creates a value-sending request with these coupons and encrypts the request at step 1202. The payer uses her personal payment device to encode the request in a graphic code (1405) at step 1406a, and the payee scans the coupon into his personal payment device at step 1406b. The rest of the transaction then follows the flow depicted in FIG. 12.

Figure 15:
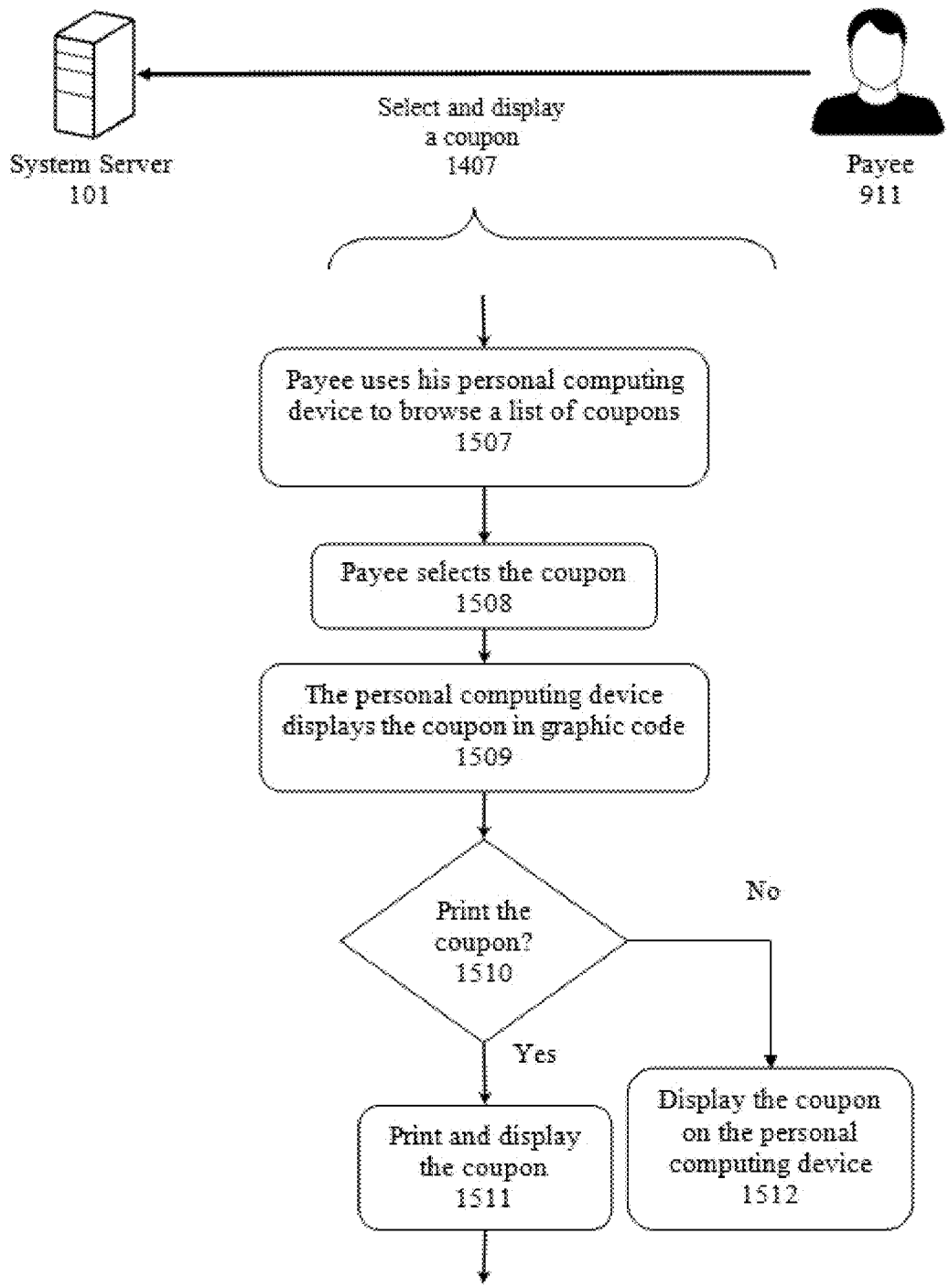
FIG. 15 is an enlarged view of the method used in FIG. 14 to select and display a coupon.

With the reference now to FIG. 15, providing an enlarged view of selecting and displaying a coupon at step 1401. At step 1507 the payee uses his personal computing device to browse a list of coupons. The personal computing device (107) is connected to a system server (101) as depicted in FIG. 1, in accordance to one embodiment of the present disclosure.

Using a Method for Secured Value Transfer to Redeem a Ticket

With reference now to FIG. 16, illustrating a form of redeeming a ticket using a method for secured value transfer, in accordance to one embodiment of the present disclosure. The transaction flow of FIG. 16 extends the transaction flow of FIG. 2 with methods and means that allows a secured redemption of a ticket. In this case the value being transferred is a ticket. The outcome of a value-transfer transaction is the redemption of the ticket.

At step 1601, a payer uses her personal payment device to retrieve a list of tickets under her possession. The payer then selects a plurality of tickets to redeem at step 1602. At step 1603 the payer then creates a request wherein the value being transferred is these tickets. The transaction flow then follows that of FIG. 9 until the system processes and validates the value-receiving request from the payee. At step 1604 the system proceeds to redeem the ticket, and notifies the payee the result at step 1605.

Securely Transferring from a First User to a Second User Data Records Validated by a Third User With reference now to FIG. 17, illustrating a form of securely transferring data records validated by a third user, in accordance to one embodiment of the present disclosure. Examples of such data records include driver licenses, proof of insurance, passports, medical records, prescriptions, etc. The transaction flow of FIG. 17 extends the transaction flow of FIG. 9 with additional steps and means whereby a data record validated by a third party can be securely transferred from a payer to a payee. For clarity, this description emphasizes on these additional steps and means.

Before the transaction, a third user, referred to as an agent (1701) in this description, validates a record (1702) at step 1703. The agent registers the validated record with the system at step 1704. A reference to the record may be sent to a payer at step 1705. When initializing a transfer of the data record to a payee, the payer creates and encrypts a value-sending request at step 1706. The request encloses the reference to the data record as the value being transferred. The transaction flow then follows that of FIG. 9 until the system processes and validates the value-receiving request from the payee. At step 1707 the system proceeds to send the validated data record to the payee.

What is claimed is:

1. A method of securely transferring data among users using a limited-use encrypted code, comprising:
creating, by the server, a server encryption key and a server decryption key;
transmitting, by the server, the server encryption key to the provider device;
obtaining, by the provider device, a cryptography technique;
creating, by the provider device, a provider private key and a provider public key based at least in part on the cryptography technique;
transmitting, by the provider device, the provider public key and a first unique identifier of the provider to the server;
storing by the server, the provider public key and the cryptography technique in association with the first unique identifier of the provider;
creating, by the provider device, a request containing a reference to data to be transferred to a recipient device of a recipient;
encrypting, by the provider device, the request using the cryptography technique and the provider private key;
encrypting, by the provider device, the first unique identifier of the provider using the server encryption key;
attaching, by the provider device, the encrypted first unique identifier of the provider to the encrypted request;
encoding, by the provider device, the attached encrypted first unique identifier of the provider and the encrypted request into a graphic code;
displaying, by the provider device, the graphic code;
scanning, by the recipient device, the graphic code displayed by the provider device;
obtaining, by the recipient device, the attached encrypted first unique identifier of the provider and the encrypted request by decoding the graphic code;
transmitting, by the recipient device to the server, the attached encrypted first unique identifier of the provider and the encrypted request along with a second unique identifier of the recipient;
obtaining, by the server, the first unique identifier by decrypting the encrypted first unique identifier using the server decryption key;
retrieving, by the server, the provider public key and the cryptography technique using the first unique identifier;
obtaining, by the server, the request by decrypting the encrypted request using the provider public key and the cryptography technique;
determining, by the server, that the request satisfies a usage limit;
validating, by the server, the request based at least in part on the determination that the request satisfies the usage limit; and
transferring, by the server, the data from a provider data store of the provider to a recipient data store of the recipient.

2. The method of claim 1, further comprising:
before storing, by the server, the provider public key, receiving, by the server, the provider public key.

3. The method of claim 1, further comprising:
prior to creating, by the provider device, the request, selecting a personal code, by the provider device, and registering the personal code with the server;
after obtaining, by the recipient device, the encrypted request,
requesting, by the recipient device, the personal code of the provider device;
receiving, by the recipient device, the personal code and sending the personal code to the server; and
receiving, by the server, the personal code and verifying the personal code using a copy of the provider's personal code registered with the server.

4. The method of claim 1, wherein the data to be transferred is a data record.

5. The method of claim 4, further comprising:
receiving, by the server from a third user, a validated record,
sending by the server to the provider device, a reference to the validated record;
wherein creating, by the provider device, the request further comprises enclosing in the request the reference to the validated record; and
wherein transferring, by the server, the data comprises transferring the validated record to the recipient data store.

6. The method of claim 1, wherein:
creating, by the provider device, the request, further comprises including in the request a transfer limit;
wherein transmitting to the server, by the recipient device, the attached encrypted first unique identifier of the provider and the encrypted request further comprises transmitting request amount along with the second unique identifier of the recipient; and
wherein determining, by the server, that the request satisfies the usage limit, further comprises checking whether the request amount exceeds the transfer limit.

7. The method of claim 1, further comprising:
prior to creating the request, registering by the recipient device, a record with the server wherein the record includes a preset value to be transferred;
sending by the recipient device to the provider device a coupon including a reference to the record;
wherein creating the request by the provider device, further comprises including the coupon in the request; and
wherein transferring, by the server, the data further comprises transferring the preset value from a provider account of the provider to a recipient account of the recipient based on the coupon.

8. The method of claim 1, further comprising:
creating by the provider device, a plain text;
computing, by the provider device, a digest based on the plain text;
wherein creating, by the provider device, the request further comprises adding the digest to the request;

wherein the method further comprises:
after encrypting the request, attaching, by the provider device, the plaintext to the encrypted request; and
after decrypting the request, verifying, by the server, the digest in the request by computing a second digest of the plain text attached to the encrypted request, and comparing the second digest with the digest in the request.

9. The method of claim 8, further comprising accessing, by the recipient device, the plain text attached to the request.

10. The method of claim 8, wherein the plain text specifies terms associated with the request, the method further comprising:
after receiving the request by the recipient device, accessing by the recipient the terms in the plain text attached to the request;
wherein transmitting, by the recipient device to the server, the attached encrypted first unique identifier of the provider and the encrypted request along with a second unique identifier of the recipient further comprises transmitting, by the recipient device to the server, the attached encrypted first unique identifier of the provider and the encrypted request along with a second unique identifier of the recipient after accessing the terms in the plain text.

11. The method of claim 1, further comprising:
after transferring, by the server, the data from the provider data store of the provider to the recipient data store of the recipient creating, by the server, a ticket.

12. The method of claim 1, wherein, transferring, by the server, the data comprises transferring value from an account associated with the provider device to an account associated with the recipient device.

* * * * *